(12) United States Patent
Wieckhorst et al.

(10) Patent No.: US 11,576,294 B2
(45) Date of Patent: Feb. 14, 2023

(54) AGRICULTURAL WORK SYSTEM (71) Applicant: CLAAS Tractor SAS, Vélizy-Villacoublay (FR)

(72) Inventors: Jan Carsten Wieckhorst, Paderborn (DE); Christian Ehlert, Bielefeld (DE); Lennart Meyer, Aachen (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 580 days.

(21) Appl. No.: 16/564,099

(22) Filed: Sep. 9, 2019

(65) Prior Publication Data
US 2020/0077561 A1 Mar. 12, 2020

(30) Foreign Application Priority Data

Sep. 10, 2018 (DE) .......................... 102018122018.9

(51) Int. Cl.
*A01B 63/02* (2006.01)
*F02D 45/00* (2006.01)
*A01B 69/00* (2006.01)

(52) U.S. Cl.
CPC ............ *A01B 63/02* (2013.01); *A01B 69/004* (2013.01); *F02D 45/00* (2013.01)

(58) Field of Classification Search
CPC .. A01B 63/02–63; A01B 69/004; F02D 45/00
See application file for complete search history.

(56) References Cited

U.S. PATENT DOCUMENTS

| 4,931,967 | A | * | 6/1990 | Boe et al. | ............ | A01B 63/112 |
|           |   |   |        |           |              | 172/3       |
| 5,012,415 | A | * | 4/1991 | Boe et al. | ............ | A01B 63/112 |
|           |   |   |        |           |              | 172/3       |

(Continued)

FOREIGN PATENT DOCUMENTS

| DE | 102012100180 A1 | 7/2012 |
| DE | 102016118203 A1 | 11/2017 |

(Continued)

OTHER PUBLICATIONS

European Search Report dated Mar. 20, 2020 in European Application No. 19184902.5 with English translation of the relevant parts.

*Primary Examiner* — Tara Mayo-Pinnock
(74) *Attorney, Agent, or Firm* — Lempia Summerfield Katz LLC (57) ABSTRACT

An agricultural work system has an agricultural work machine to which at least one mounted implement can be fitted via at least one implement interface. A work machine configuration is associated with the work machine, and a mounted implement configuration is associated with the mounted implement. A drive unit is provided which acts via a drivetrain on ground engaging elements, particularly on tires. A system control and a control/display unit associated with the work machine are provided. It is proposed that the system control is adapted to determine the mounted implement configuration, to calculate the implement interface load transmitted via the implement interface based on the determined mounted implement configuration, and to evaluate and/or optimize the work machine configuration based on the calculated implement interface load.

20 Claims, 2 Drawing Sheets

(56) References Cited

U.S. PATENT DOCUMENTS

| | | | |
|---|---|---|---|
| 5,472,056 A * | 12/1995 | Orbach | A01B 63/1117 |
| | | | 172/2 |
| 6,144,910 A * | 11/2000 | Scarlett et al. | A01B 63/023 |
| | | | 701/50 |
| 9,078,391 B2 | 7/2015 | Pichlmaier | |
| 9,334,827 B2 | 5/2016 | Seelke et al. | |
| 2003/0121674 A1 * | 7/2003 | Scarlett et al. | A01B 63/111 |
| | | | 172/2 |
| 2012/0185137 A1 | 7/2012 | Schedgick et al. | |
| 2014/0222302 A1 * | 8/2014 | Pichlmaier | A01B 76/00 |
| | | | 701/50 |
| 2014/0343802 A1 * | 11/2014 | Pichlmaier | A01B 63/112 |
| | | | 701/50 |
| 2017/0325394 A1 | 11/2017 | Clement et al. | |
| 2017/0325395 A1 | 11/2017 | Noyer et al. | |
| 2017/0354080 A1 | 12/2017 | Foster et al. | |
| 2018/0290696 A1 * | 10/2018 | Schott et al. | B62D 49/0628 |

FOREIGN PATENT DOCUMENTS

| | | | | |
|---|---|---|---|---|
| EP | 0377216 A2 * | 7/1990 | | A01B 63/1117 |
| EP | 2708103 A2 | 3/2014 | | |
| EP | 2997805 A1 * | 3/2016 | | A01B 79/005 |
| WO | 2017/214440 A1 | 12/2017 | | |

* cited by examiner

AGRICULTURAL WORK SYSTEM

CROSS-REFERENCE TO RELATED APPLICATIONS

This application claims priority under 35 USC 119 of German Application No. DE102018122018.9, filed on Sep. 10, 2018, the disclosure of which is herein incorporated by reference.

BACKGROUND OF THE INVENTION

The invention is directed to an agricultural work system with an agricultural work machine to which at least one mounted implement can be fitted via at least one implement interface, an agricultural work machine of such a work system, and a method for the operation of such a work system.

A work system as disclosed in EP 2 708 103 B1 has a control arrangement which is directed to the evaluation and/or optimization of the work machine configuration of the work machine depending on the type of mounted implement used. To this end, the respective relevant parameters of known mounted implements are filed in a data storage of the control arrangement. The work machine configuration comprises, for example, the ballasting of the work machine or the tire pressures of the tires of the work machine. In this connection, the evaluation and optimization of the work machine configurations is directed to the objective of a nominal service life of the work machine.

While the known work system allows a first basic approach for the evaluation and optimization of work machine configurations depending on the mounted implement provided in each instance, the accuracy of the evaluation or optimization poses a challenge. Accordingly, the existing optimizing potential cannot be fully exploited.

SUMMARY OF THE INVENTION

The invention addresses the problem of configuring and further developing the known work system such that the efficiency of the evaluation and optimization of the work machine configuration is increased. This problem is solved according to the invention by an agricultural work system with an agricultural work machine to which at least one mounted implement can be fitted via at least one implement interface. A work machine configuration is associated with the work machine, and a mounted implement configuration is associated with the mounted implement. A drive unit is provided which acts via a drivetrain on ground engaging elements, particularly on tires. A system control and a control/display unit associated with the work machine are also provided. The system control is adapted to determine the mounted implement configuration, to calculate the implement interface load (L) transmitted via the implement interface based on the determined mounted implement configuration, and to evaluate and/or optimize the work machine configuration based on the calculated implement interface load (L).

First of all, a work machine configuration, mentioned above, is associated with the work machine, which work machine configuration preferably includes the type of work machine and possibly the essential adjusting parameters of the work machine. A mounted implement configuration is associated with the mounted implement, which mounted implement configuration correspondingly preferably includes the type of mounted implement and possibly the essential adjusting parameters of the mounted implement.

The agricultural work machine is a self-propelled work machine which is outfitted with a drive unit. The drive unit acts via a drivetrain on ground engaging elements, particularly on tires. The expression "ground engaging element" includes all such components via which locomotion of the work machine on the ground is made possible. This includes, for example, all arrangements of continuous track, tires or the like. Tires may be, for example, pneumatic tires or the like.

Lastly, there is provided a control/display unit associated with the work machine by which information can be conveyed to the operator and via which information can be entered by the operator.

A key basic consideration consists in that the work machine is mechanically affected by the mounted implement primarily via the respective implement interface. In the present case, in which the evaluation and optimization should take into account the respective mounted implement, the best evaluation results or optimization results can be achieved with an exact knowledge of the implement interface load transmitted via the implement interface.

In particular, it is proposed that the system control is adapted to determine the mounted implement configuration, to calculate the implement interface load transmitted via the implement interface based on the determined mounted implement configuration, and to evaluate and/or optimize the work machine configuration based on the calculated implement interface load.

Accordingly, as proposed herein, the implement interface load is calculated from knowledge of the mounted implement configuration so that optimal basic data are available for the evaluation and optimization as proposed herein. The evaluation and optimization can be carried out under diverse objectives, in particular with respect to the objectives of reducing mechanical power loss, increasing fuel efficiency, prolonging service life or maintaining the nominal service life, the degree of ground protection, traction efficiency, the resulting work output, or the like.

In principle, at least part of the system control, preferably the entire system control, can be configured as a machine control and is arranged in the work machine. However, it can also be advantageous that at least part of the system control is configured as telemetry control which communicates with a control component in the machine via a wireless connection or the like.

Great flexibility is given in the calculation of the implement interface load in that the system control determines a mounted implement model based on the determined mounted implement configuration, and this mounted implement model maps the relationship between a set of input variables and the resulting implement interface load. This provides the basic possibility of expanding the calculation of the implement interface load to additional mounted implements in a flexible manner.

The calculated implement interface load includes weight-related load components which are gravity-related and/or inertia-related load components. These load components are prominent in the case of road travel.

In the work operation of the work system according to the invention, process-related load components come in addition to the weight-related load components. Such load components proceed, for example, from the engagement between the mounted implement and the field soil which takes place during plowing or the like.

The implement interface load is determined from the existing equilibrium of forces and moments at the mounted implement. In this connection, depending upon the type of operation, exclusively weight-related load components (road travel) or weight-related and process-force-related load components (work operation) are calculated.

An even greater flexibility can be achieved in that the mounted implement model can be parameterized by the operator. For example, the mounted implement model can be parameterized for a change in the mounted implement adjustment.

In preferred variants for the definition of the set of input variables from which the implement interface load is determined based on the mounted implement model, an input variable can be the fill level of operating medium for the mounted implement, which primarily affects the weight-related load component. Alternatively or additionally, an input variable can be the soil characteristics of the field soil, which particularly affects the process forces. Lastly, it can be provided alternatively or additionally that an input variable relates to a work process parameter such as the traveling speed of the work machine which, depending on constructional configuration, can affect the weight-related and/or process-related load component at the implement interface load.

At least part of the set of input variables can preferably be entered by the operator via the control/display unit. In a particularly preferred configuration, both the parameterization of the mounted implement model and the input of the set of input variables can be performed by means of a natural language dialog via the control/display unit.

The evaluation and optimization of the work machine configuration is provided, as proposed herein, based on the calculation of the implement interface load. The evaluation and optimization are preferably based on a work machine model which maps the relationship between the implement interface load and the distribution of forces and moments existing at the work machine. In this case also, the utilization of a work machine model which can preferably be parameterized allows a particularly great flexibility with respect to a change in or expansion of the work machine.

The evaluation or optimization can relate to the ballasting of the work machine and/or to the tire pressures of the pneumatic tires of the work machine. Other objects of evaluation or optimization are possible.

In a further teaching of the invention, an agricultural work machine of an agricultural work system as proposed herein is claimed as such, and the system control is configured according to this further teaching as a machine control which is functionally and spatially associated with the work machine. In this respect, reference is made to all of the statements regarding the first teaching.

In a further teaching, the described method for the operation of the agricultural work system as proposed herein is claimed as such.

In accordance with the described operation method of the first teaching, it is key in the further teaching that the mounted implement configuration is determined by means of the system control based on the determined implement configuration which is calculated via the implement interface load transmitted via the implement interface, and the work machine configuration is evaluated and/or optimized based on the calculated implement interface load. In this respect, reference is made to all of the statements regarding the first teaching.

In the particularly preferred configuration, fitting the mounted implement to the work machine causes a mounted implement control associated with the mounted implement to transmit the mounted implement configuration and/or the mounted implement model to the system control. This results in a certain plug-and-play functionality which allows a virtually automatic evaluation and optimization of the work system as proposed herein and therefore a high level of user-friendliness.

BRIEF DESCRIPTION OF THE DRAWINGS

The invention will be described in the following with reference to drawings showing only one embodiment example. In the drawings.

DETAILED DESCRIPTION OF THE EMBODIMENTS

Numerous variants are conceivable for configuring the depicted work machine 1 of the agricultural work system as proposed herein. For example, the work machine 1 can be a tractor, a high loader, in particular a telescopic loader, a self-propelled harvester, or the like.

At least one mounted implement 3 can be fitted to the work machine 1 via at least one implement interface 2. Broadly, the implement interface 2 in this instance is a mechanical coupling between the work machine 1 and the mounted implement 3. In the embodiment example which is shown here and is preferred, the implement interface 2 is configured as a three-point power lift which has two lower links 2a and one upper link 2b for coupling to the mounted implement 3. The implement interface 2 can be configured as a front power lift or rear power lift. In principle, however, the implement interface 2 can also be a hitch bar. Other variants for the implement interface 2 are systems with simple drawbar pin coupling, hitch hook, tow ball coupling, or the like.

The mounted implement 3 can be, for example, a tillage implement such as a plow (FIG. 1), a cultivator, a harrow, or the like. Other mounted implements 3, for example, haymaking machines, seeders or the like, can also be used.

A work machine configuration 9 is associated with work machine 1, while a mounted implement configuration 8 is associated with mounted implement 3. The configurations give the type of work machine and mounted implement and possibly the relevant adjusting parameters as was described in the generic part of the specification.

Work machine 1 is outfitted with a drive unit 4 which, in the present instance and preferably, has an internal combustion engine. Drive unit 4 acts in conventional manner via a drivetrain on ground engaging elements, particularly on the tires 5, of which there are four in the present case and preferably. Work machine 1 is preferably a four-wheel-drive work machine 1 so that all four of the tires 5 are driven or drivable.

A system control 6 is provided for controlling the components relevant to drive. In the present instance and preferably, the system control 6 is the machine control of work machine 1. There is associated with work machine 1 a control/display unit 7 which provides the information interface to the operator of work machine 1.

It is key that system control 6 is adapted to determine the mounted implement configuration 8. At least part of the mounted implement configuration 8 can be determined, for example, based on a communication cycle with a mounted implement control 3a which is merely implied in FIG. 2. Alternatively or additionally, it can be provided that at least part of the mounted implement configuration 8 is determined via control/display unit 7 based on user input. It is also conceivable that an information carrier such as an RFID chip is arranged at the mounted implement 3 and is read by system control 6 to identify the mounted implement 3; system control 6 takes the mounted implement configuration 8 from this information carrier possibly via a database.

System control 6 is further adapted to calculate the implement interface load L transmitted via implement interface 2 based on the determined implement configuration 8. The implement interface load L includes all of the relevant forces and moments exerted on work machine 1 by the mounted implement 3. In the case of the implement interface 2 configured as three-point power lift, there are three force application points. For the sake of simplicity, reference is made hereinafter to the resulting virtual force application point $L_0$ which is acted upon by the imaginary resulting forces and moments.

Figure 1:
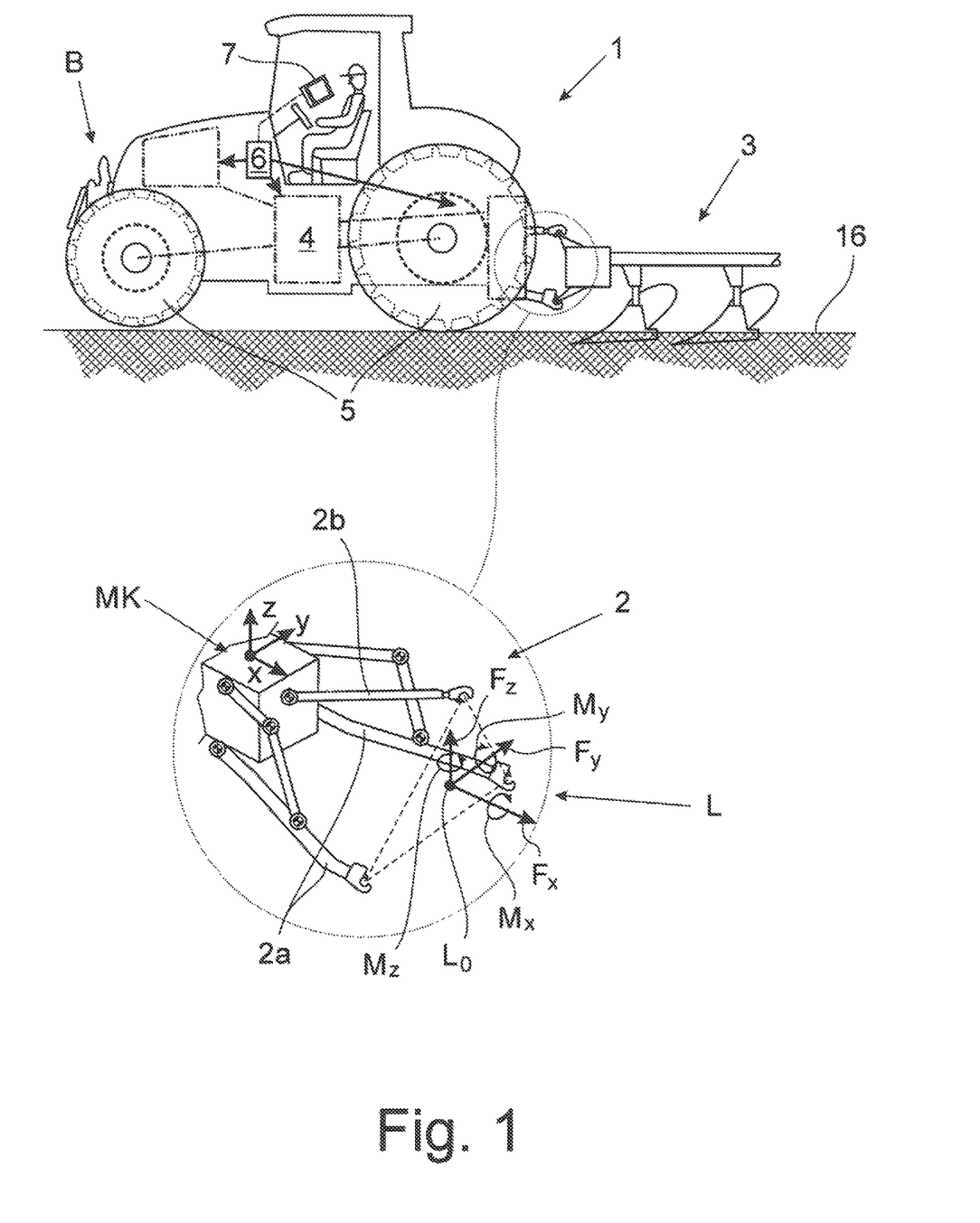
FIG. 1 shows a schematic view showing the key components of an agricultural work system as proposed herein with an agricultural work machine, including mounted implement.

FIG. 1 shows, for example, that forces $F_x$, $F_y$, $F_z$ and torques $M_x$, $M_y$ and $M_z$ which act at virtual force application point $L_0$ and which refer to the machine coordinate system MK are associated with the implement interface load L. Forces $F_x$, $F_y$, $F_z$ are the forces acting on work machine 1 proceeding from mounted implement 3 in x direction, y direction and z direction of the machine coordinate system MK. Torques $M_x$, $M_y$ and $M_z$ are the torques acting on work machine 1 proceeding from mounted implement 3 around the x-axis, y-axis and z-axis, respectively, of the machine coordinate system MK. This is shown in the detail view of FIG. 1.

Lastly, system control 6 is adapted to evaluate and/or optimize the work machine configuration 9 based on the calculated implement interface load L. Particulars of the evaluation and optimization will be discussed later.

Figure 2:
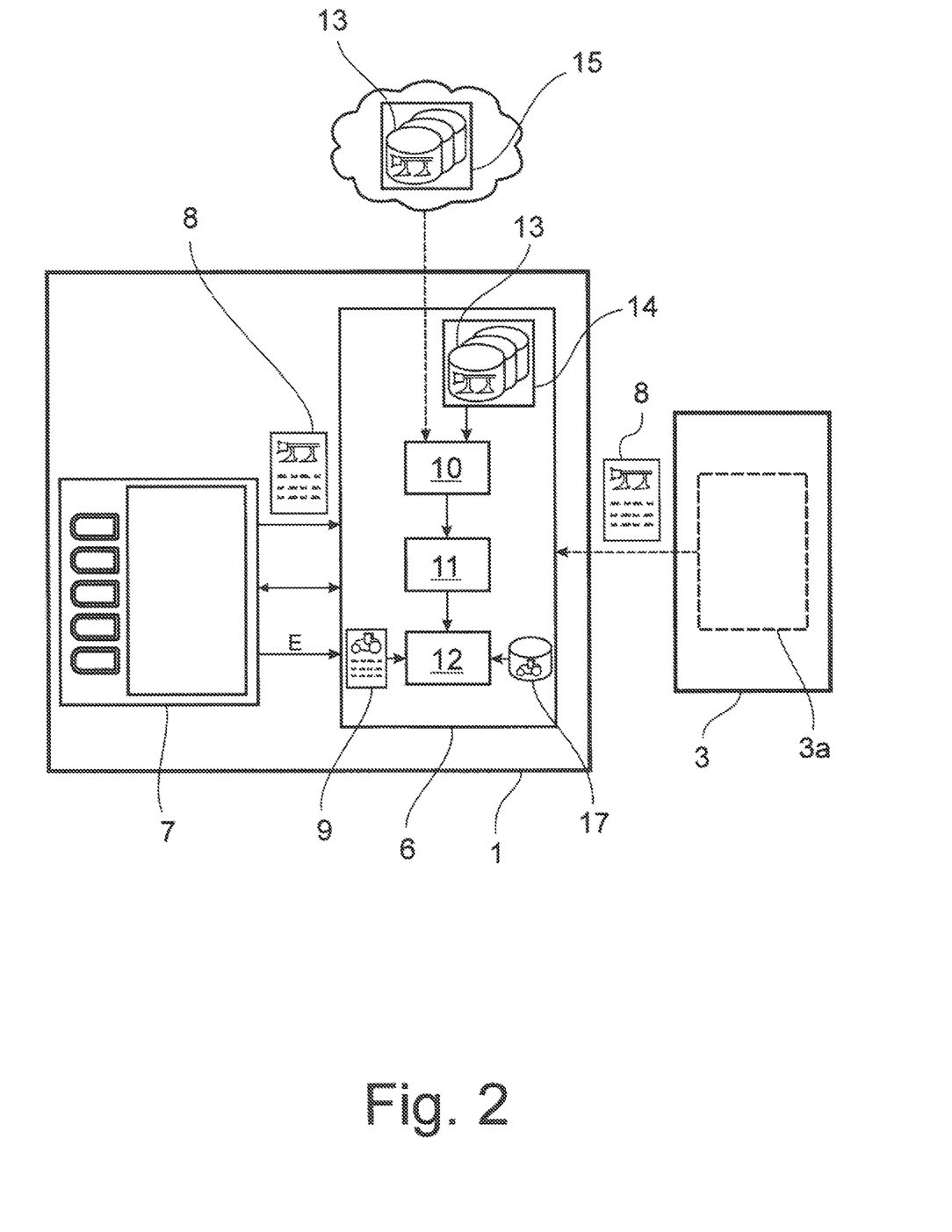
FIG. 2 shows the control components key to the solution as proposed herein.

The manner of operation, as proposed herein, of system control 6 is represented in FIG. 2 by three function modules 10, 11, 12. Function module 10 relates to the determination of mounted implement configuration 8, function module 11 relates to the calculation of implement interface load L, and function module 12 relates to the evaluation and/or optimization of work machine configuration 9.

It may be noted that the implement interface load L with work machine 1 at standstill comprises static interface forces $F_x$, $F_y$ and $F_z$ and/or interface torques $M_x$, $M_y$ and $M_z$, while the work machine additionally comprises dynamic interface forces $F_x$, $F_y$ and $F_z$ and/or interface torques $M_x$, $M_y$ and $M_z$ during road travel and during work operation due to the motion of the work machine 1.

In the present instance and preferably, at least part of the system control 6, preferably the entire system control 6, is configured as machine control and is arranged in work machine 1. In principle, it is conceivable that at least part of system control 6 is configured as telemetry control and is arranged separately from work machine 1. Broadly, system control 6 can be at least partially decentrally structured.

It has already been noted that the mounted implement configuration 8 preferably comprises the type of mounted implement 3 and possibly the relevant adjusting parameters of mounted implement 3 and that work machine configuration 9 preferably comprises the type of work machine and possibly the relevant adjusting parameters of work machine 1.

In the embodiment example shown in FIG. 1, the type of mounted implement 3 is a plow which is configured as a mounted plow.

In the embodiment example shown in FIG. 1, work machine configuration 9 comprises, as type of work machine 1, a four-wheel-drive tractor with tires 5 configured as pneumatic tires and with a variable ballasting B. Correspondingly, the relevant adjusting parameters can be the ballasting B and/or the tire pressures of the tires 5 of work machine 1 which are configured as pneumatic tires.

The ballasting B of work machine 1 can include front weight (FIG. 1), rear weight or the like. Depending on the outfitting of work machine 1, the ballasting B can be changed completely manually, i.e., by manually adding, removing and relocating ballasting weights, or automatically, particularly in a motor-assisted matter.

The manner of calculating the implement interface load L is especially important in the present case. Preferably, system control 6 determines a mounted implement model 13 based on the determined mounted implement configuration 8, which mounted implement model 13 maps the relationship between an input variable set E and the resulting implement interface load L. The determination of the mounted implement model 13 is carried out within the framework of function module 10 in which the mounted implement configuration 8 is also determined. This is appropriate because the determination of the mounted implement configuration 8 and the determination of the mounted implement model 13 can also be combined in a single method step.

In principle, the mounted implement configuration 8 as such already comprises the mounted implement model 13 so that the determination of the mounted implement model 13 proceeds from a corresponding evaluation of the mounted implement configuration 8. The mounted implement configuration 8 and mounted implement model 13 are then combined in one and the same data set.

System control 6 can receive mounted implement model 13 from mounted implement control 3a in principle. In the present instance and preferably, however, system control 6 requests mounted implement model 13 from a database 14 in which various mounted implement models 13 which are associated with a mounted implement configuration 8 are filed. Database 14 is associated with system control 6 and is located in work machine 1. Alternatively or additionally, such a database can also be provided remote of the working machine 1. This is indicated in FIG. 2 by database 15 which is available on a data server remote of the work machine 1, in this case a data cloud.

System control 6 calculates the implement interface load L preferably based on the mounted implement model 13 which effectively maps the system behavior of mounted implement 3.

Depending on the case of application, there are various conceivable advantageous variants for realizing mounted implement model 13 in information technology respects. For example, mounted implement model 13 can take the form of at least one analytical formula. Alternatively or additionally, mounted implement model 13 can take the form of a table and/or at least one characteristic map. Lastly, mounted implement model 13 can conceivably take the form of a set of rules which can be implemented, for example, as a software routine.

As was stated above, the calculated implement interface load L comprises weight-related load components, i.e., load components which proceed from the mass of the mounted implement 3 as such. This includes gravity-related load components which proceed from gravitational force. Alternatively or additionally, inertia-related load components proceeding from inertial force are also comprised. To calculate these weight-related load components, mounted implement model 13 preferably maps the distribution of the center of mass at the mounted implement 3.

In addition to weight-related load components, the calculated implement interface load L preferably also comprises process-related load components which relate in particular to the engagement between mounted implement 3 and field soil 16. In order to calculate these process-related load components, mounted implement model 13 maps the process force distribution at the mounted implement 3.

System control 6 preferably determines the equilibrium of forces and moments present at mounted implement 3 from the center-of-mass distribution at mounted implement 3 and the process force distribution present in this instance and preferably at mounted implement 3 and, from this, determines the implement intersection load L transmitted via the implement intersection 2. This calculation of the implement intersection load L based on the equilibrium of forces and moments can be carried out simply in an automated manner provided the above-mentioned mounted implement model 13 is present.

For purposes of a particularly flexible applicability of the solution as proposed herein, the mounted implement model 13 can be parameterized in the present case and preferably for a change in the mounted implement configuration. With a plow, for example, the plowshare angle can possibly be adjusted by the operator, which can be taken into account through a corresponding parameterization of the mounted implement model 13. The parameterization of mounted implement model 13 can preferably be carried out by the operator via the control/display unit 7. For this purpose, the parameterization is preferably provided via a natural language dialog.

Alternatively, it can also be provided that mounted implement model 13 is parameterized in a measuring cycle. The measuring cycle can be implemented, for example, by means of a vehicle scale. In a first step, for example, work machine 1 as such and, subsequently, work machine 1 together with mounted implement 3 can be weighed so that the weight of mounted implement 3 can be determined easily. For this purpose, the operator can be instructed via a natural language dialog by means of the control/display unit 7. The center-of-mass distribution of the mounted implement 3 which is additionally required for calculating the implement interface load L can be taken from a database, for example. Alternatively, it is also possible for the operator to carry out corresponding input via the control/display unit 7.

As mentioned above, the implement interface load L is preferably calculated based on the input variables set E and the mounted implement model 13. Different variants which can be combined with one another are possible for the input variables of the input variable set E.

In case the mounted implement 3 is adapted to the consumption of operating media such as fertilizer or the like and correspondingly has an operating medium tank, the operating medium fill level for the mounted implement 3 is preferably an input variable of the input variable set E. The implement interface load L is then calculated at least based on the operating medium fill level and the mounted implement model 13. This relates in particular to the weight-related load component of the implement interface load L which proceeds from the weight of the operating medium.

In case the mounted implement 3 is a tillage implement, an input variable of the input variable set E preferably relates to the soil characteristics of the field soil 16, and system control 6 calculates the process-related load component of the implement interface load at least based on the soil characteristics and the mounted implement model 13. It will be appreciated that work process parameters, to be described later, such as the traveling speed of work machine 1 are also included in this calculation of the process-related load component.

In principle, the soil characteristics can be entered numerically via characteristic values. However, it is also possible in principle that the input variable relating to the field soil 16 is a classification of the field soil 16 from a quantity of classes of field soil types and/or from a quantity of classes of field soil characteristics. Exemplary classes for field soil types are the classes "no growth" and "growth". In this case, for example, a plant variety can also be determined as class. Exemplary classes of field soil characteristics are "dry", "medium-moist" and "moist".

As mentioned above, an input variable of an input variable set can also be a work process parameter. In that case, the implement interface load L, in the present instance and preferably, a weight-related and/or process-related load component of the implement interface load L is calculated at least based on the work process parameter. The work process parameter can be, for example, the traveling speed of work machine 1 and/or, referring to the example of the plow shown in FIG. 1, the depth to which the plow engages in the field soil 16. Other variants for the work process parameters are the drive output of the work machine 1 and/or the efficiency in a drivetrain of the work machine 1.

Preferably, at least the one portion of the input variable set E can be entered by the operator via the control/display unit 7. In a particularly preferred configuration, system control 6 requests at least part of the input variable set E from the operator via the control/display unit 7 depending on the determined mounted implement configuration 8. In this case also, a natural language dialog is provided in a particularly preferred configuration. The flow of the natural language dialog depends on the determined mounted implement configuration 8.

For the evaluation and/or the optimization of the work machine configuration 9, there is preferably a work machine model 17 in system control 6 which maps the relationship between the implement interface load L and the distribution of forces and moments existing at the work machine 1. The evaluation is carried out in that system control 6 evaluates the work machine configuration 9 based on the work machine model 17 and the calculated implement interface load L according to at least one evaluation criterion. The optimization of the work machine configuration 9 is correspondingly provided such that system control 6 optimizes the work machine configuration 9 based on the work machine model 17 and the calculated implement interface load L according to at least one optimization criterion. The evaluation and optimization can relate, for example, to the ballasting B of the work machine 1 and/or the tire pressures of the tires 5 of work machine 1 which are configured as pneumatic tires. The evaluation and optimization of the work machine configuration 9 can be carried out according to various objectives as was mentioned in the generic part of the specification. For example, the evaluation may show that the ballasting B is not optimal. A change in the ballasting B can then be suggested to the operator via control/display unit 7 within the framework of optimization, for example, the addition of weights to the front area or rear area of the work machine 1. The same applies for changing the tire pressures of the tires 5 configured as pneumatic tires. In this case, however, it is also conceivable to carry out the optimization of tire pressures by means of a tire control system by means of a compressor or the like. Accordingly, absent a decentral control structure, work machine 1 is configured to be autonomous with respect to the control installation. In this respect, reference is made to all of the statements regarding the first teaching.

According to a further teaching which is likewise accorded independent consideration, a method for the operation of the agricultural work machine 1 as proposed herein is claimed as such.

As was stated above, it is key according to the method as proposed herein that the mounted implement configuration 8 is determined by means of system control 6 based on the determined mounted implement configuration 8, the implement intersection load L transmitted via the implement interface 2 is calculated, and the work machine configuration 9 is evaluated and/or optimized based on the calculated implement intersection load L. In this respect, reference may also be made to the statements regarding the first teaching.

According to a preferred configuration of the method as proposed herein, at least part of the mounted implement configuration 8 and/or mounted implement model 13 is transmitted to the system control 6 by an implement control 3a associated with the mounted implement 3 by fitting mounted implement 3 to work machine 1. This corresponds to an above-mentioned plug-and-play functionality which, as also mentioned above, leads to a particularly high level of user-friendliness.

Reference Characters
1 work machine
2 implement interface
2a lower link
2b upper link
3 mounted implement
3a mounted implement control
4 drive unit
5 tires
6 system control
7 control/display device
8 mounted implement configuration
9 work machine configuration
10 function module
11 function module
12 function module
13 mounted implement model
14 database
15 database
16 field soil
17 work machine model
E input variable set
F forces
L implement interface load
$L_0$ virtual force application point
M torques
MK machine coordinate system

What is claimed is:

1. An agricultural work machine comprising:
   at least one implement interface configured to fit at least one mounted implement, the at least one mounted implement having a mounted implement configuration;
   a drive unit configured to act via a drivetrain on ground engaging elements of the agricultural work machine; and
   a system control, the system control configured to:
      determine the mounted implement configuration,
      determine, based on a mounted implement model, an implement interface load transmitted via the implement interface, wherein the mounted implement model is based on the mounted implement configuration and configured to correlate one or more input variables indicative of at least one aspect of operation and the implement interface load,
      analyze, based on an agricultural work machine model, an agricultural work machine configuration, the agricultural work machine model configured to correlate the implement interface load and a distribution of forces and moments existing at the agricultural work machine,
      determine, based on the analysis, at least one modification of operation; and
      at least one of: output, on an output device, the at least one modification of the operation; or automatically implement the at least one modification of the operation.

2. The agricultural work machine of claim 1, wherein at least part of the system control is configured as a machine control and is arranged in the agricultural work machine.

3. The agricultural work machine of claim 1, wherein at least part of the system control is configured as telemetry control and is arranged separate from the agricultural work machine.

4. The agricultural work machine of claim 1, wherein the system control is configured to:
   determine the mounted implement model based on the determined mounted implement configuration, wherein the mounted implement model maps a relationship between an input variable set comprising the one or more input variables and a resulting implement interface load, and
   calculate the implement interface load based on the input variable set and the mounted implement model, wherein the determined mounted implement model is provided in the system control in a form of one or more of: at least one analytical formula; at least one table; at least one characteristic map; or at least one set of rules.

5. The agricultural work machine of claim 4, wherein the implement interface load includes weight-related load components comprising gravity-related and/or inertia-related load components, and wherein the mounted implement model maps a center-of-mass distribution at the at least one mounted implement for calculating the weight-related load components.

6. The agricultural work machine of claim 4, wherein the implement interface load comprises process-related load components proceeding from an engagement between the at least one mounted implement and field soil, and wherein the mounted implement model maps a process force distribution at the at least one mounted implement for calculating the process-related load components.

7. The agricultural work machine of claim 6, wherein the system control determines equilibrium of forces and moments present at the at least one mounted implement from a center-of-mass distribution at the at least one mounted implement and the process force distribution present at the at least one mounted implement and, from this, calculates an implement intersection load transmitted via an implement intersection.

8. The agricultural work machine of claim 4, wherein the mounted implement model is configured to be parameterized for a change in mounted implement adjustment such that a plurality of input parameters are used for the parameterization of the mounted implement model.

9. The agricultural work machine of claim 8, wherein the agricultural work machine model is further parameterized in order to account for a change in or an expansion of the agricultural work machine.

10. The agricultural work machine of claim 4, wherein the at least one mounted implement is configured for consumption of operating media and has an operating medium tank,
wherein at least one of the one or more input variables of the input variable set relates to an operating medium fill level for the at least one mounted implement, and
wherein the implement interface load is calculated at least based on the operating medium fill level and the mounted implement model.

11. The agricultural work machine of claim 4, wherein at least one of the one or more input variables of the input variable set relates to soil characteristics of field soil, and
wherein the system control is configured to calculate a process-related load component of the implement interface load at least based on the soil characteristics and the mounted implement model.

12. The agricultural work machine of claim 11, wherein the input variable relating to the field soil is a classification of the field soil from a quantity of classes of field soil types and/or from a quantity of classes of field soil characteristics.

13. The agricultural work machine of claim 4, wherein at least one of the one or more input variables of the input variable set is a work process parameter, in the form of one or more of a traveling speed of the agricultural work machine, a depth of engagement in field soil, a drive output of a drivetrain of the agricultural work machine, and
wherein the implement interface load, which comprises one or both of a weight-related load component or process-related load component of the implement interface load, is calculated at least based on the work process parameter and the mounted implement model.

14. The agricultural work machine of claim 1, wherein the system control is configured to automatically implement the at least one modification of the operation.

15. The agricultural work machine of claim 1, wherein the system control is configured to determine the mounted implement configuration and determine the mounted implement model in a single step;
wherein the mounted implement configuration comprises the mounted implement model; and
wherein the mounted implement configuration and the mounted implement model are combined in a same data set.

16. The agricultural work machine of claim 1, wherein the system control is configured to determining the at least one modification of operation by evaluating the agricultural work machine configuration and the implement interface load according to at least one evaluation criterion or at least one optimization criterion; and
wherein the at least one evaluation criterion or the at least one optimization criterion comprises at least one of: ballasting of the agricultural work machine or tire pressure of tires of the agricultural work machine.

17. The agricultural work machine of claim 16, wherein the at least one evaluation criterion or the at least one optimization criterion comprises the tire pressure of the tires of the agricultural work machine; and
wherein the system control is configured to automatically control a tire control system in accordance with an optimized tire pressure determined by the system control.

18. An agricultural work system comprising:
an agricultural work machine, having an agricultural work machine configuration, at least one mounted implement that is configured to be fitted via at least one implement interface to the agricultural work machine, the at least one mounted implement having a mounted implement configuration,
a drive unit which acts via a drivetrain on ground engaging elements of the agricultural work machine,
a system control configured as a machine control and a control/display unit associated with the agricultural work machine, the system control configured to:
determine the mounted implement configuration,
determine, based on a mounted implement model, an implement interface load transmitted via the implement interface, wherein the mounted implement model is based on the mounted implement configuration and configured to correlate one or more input variables indicative of at least one aspect of operation and the implement interface load,
analyze, based on an agricultural work machine model, an agricultural work machine configuration, the agricultural work machine model configured to correlate the implement interface load and a distribution of forces and moments existing at the agricultural work machine,
determine, based on the analysis, at least one modification of operation; and
at least one of: output, on an output device, the at least one modification of the operation; or automatically implement the at least one modification of the operation.

19. A method for operating an agricultural work system, wherein the agricultural work system has an agricultural work machine to which at least one mounted implement is configured to be fitted via at least one implement interface, wherein an agricultural work machine configuration is associated with the agricultural work machine, wherein a mounted implement configuration is associated with the at least one mounted implement, wherein a drive unit is provided which acts on tires via a drivetrain, and wherein a system control and a control/display unit associated with the agricultural work machine are provided, the method comprising:
determining the mounted implement configuration by means of the system control,
determining, based on a mounted implement model, an implement interface load transmitted via the implement interface, wherein the mounted implement model is based on the mounted implement configuration and configured to correlate one or more input variables indicative of at least one aspect of operation and the implement interface load,
analyzing, based on an agricultural work machine model, the agricultural work machine configuration, the agricultural work machine model being a correlation between an implement interface load and a distribution of forces and moments existing at the agricultural work machine,
determining, based on the analysis, at least one modification of operation; and at least one of: outputting, on an output device, the at least one modification of the operation; or automatically implementing the at least one modification of the operation.

20. The method according to claim 19, wherein one or both of the mounted implement configuration or a mounted implement model are transmitted to the system control by an implement control associated with the at least one mounted implement by fitting the at least one mounted implement to the agricultural work machine.

\* \* \* \* \*